US012637893B1

(12) United States Patent
Chen et al.

(10) Patent No.: US 12,637,893 B1
(45) Date of Patent: May 26, 2026

(54) AUTOMATIC DOOR OPENING MECHANISM

(71) Applicant: HSIN CHONG MACHINERY WORKS CO. LTD., Taoyuan City (TW)

(72) Inventors: Kai-Hsiang Chen, Taoyuan City (TW); Chih-Ta Hou, Taoyuan City (TW); Chi-Dah Chiang, New Taipei City (TW)

(73) Assignee: HSIN CHONG MACHINERY WORKS CO. LTD., Taoyuan City (TW)

( * ) Notice: Subject to any disclaimer, the term of this patent is extended or adjusted under 35 U.S.C. 154(b) by 0 days.

(21) Appl. No.: 19/208,430

(22) Filed: May 14, 2025

(51) Int. Cl.
*E05F 15/622* (2015.01)

(52) U.S. Cl.
CPC ....... *E05F 15/622* (2015.01); *E05Y 2201/216* (2013.01); *E05Y 2900/132* (2013.01)

(58) Field of Classification Search
None
See application file for complete search history.

(56) References Cited

U.S. PATENT DOCUMENTS 6,237,433 B1 * 5/2001 Rodrigues ........... F16H 25/2025 403/104
7,500,711 B1 * 3/2009 Ewing ................... E05F 15/622 49/343
9,222,296 B2 * 12/2015 Hamminga ............. E05F 15/41
9,976,332 B2 * 5/2018 Scheuring ................. F16D 7/06
10,428,572 B2 * 10/2019 Oster ..................... E05F 15/622
10,683,691 B2 * 6/2020 Podkopayev ......... E05C 17/203
11,008,780 B2 * 5/2021 Oxley ................... E05C 17/203
11,168,770 B2 * 11/2021 Taylor ................... E05F 15/619
11,713,609 B2 * 8/2023 Leonard ................ E05F 15/622 49/324

(Continued)

FOREIGN PATENT DOCUMENTS

CN 118774526 A * 10/2024 .............. E05F 15/60
DE 102018121533 A1 * 3/2020 ............ E05F 15/622

(Continued)

*Primary Examiner* — Catherine A Kelly
(74) *Attorney, Agent, or Firm* — HDLS IPR SERVICES; Chun-Ming Shih

(57) ABSTRACT

An automatic door opening mechanism includes a driving source, a transmission assembly, a screw assembly, a clutch assembly, and engaging members. The transmission assembly is driven by the source. The screw assembly includes a nut with a positioning groove and a screw rod connected to an open-close member. The clutch assembly, between the transmission and screw assemblies, includes a retainer, an interactive structure along the nut's outer periphery, a latching structure along the transmission assembly's inner periphery, and rolling balls movably received in the retainer and positioned between the latching and interactive structures. The engaging members, each with an inclined plane corresponding to a rolling ball, are arranged circularly in the positioning groove. When the open-close member causes the transmission assembly, latching structure, and retainer to move together longitudinally relative to the screw assembly, the rolling balls follow the retainer and are lifted radially by the inclined planes.

15 Claims, 18 Drawing Sheets

(56) References Cited

U.S. PATENT DOCUMENTS

| | | | | |
|---|---|---|---|---|
| 12,338,671 B2 * | 6/2025 | Zeabari | ................. | E05F 15/622 |
| 12,345,084 B2 * | 7/2025 | Leonard | .................. | E05F 15/41 |
| 12,516,562 B2 * | 1/2026 | Noguchi | ............... | E05F 15/622 |
| 12,553,274 B2 * | 2/2026 | Chen | ..................... | E05F 15/622 |
| 2019/0225121 A1 * | 7/2019 | Chiang | .................. | B60N 2/165 |
| 2024/0337147 A1 * | 10/2024 | Chen | ..................... | E05F 15/622 |
| 2025/0129654 A1 * | 4/2025 | Cumbo | ................. | E05F 15/622 |

FOREIGN PATENT DOCUMENTS

| | | | | |
|---|---|---|---|---|
| DE | 102021106708 A1 * | 9/2021 | ............ | E05F 15/622 |
| DE | 102023107391 B3 * | 7/2024 | ............. | F16H 25/20 |
| EP | 3828371 B1 * | 7/2024 | ......... | F16H 25/2021 |

* cited by examiner

AUTOMATIC DOOR OPENING MECHANISM

BACKGROUND OF THE DISCLOSURE

Technical Field

The present disclosure relates to a mechanism for driving an open-close member to perform opening and closing operations, and more particularly to an automatic door opening mechanism.

Description of Related Art

In the third embodiment of the US patent publication No. US20240337147A1, a clutch assembly 2*b* includes a retainer 29*c*, an interactive structure 21*b*, a latching ring 22*c*, rolling balls 28, and auxiliary elastic elements S. A transmission assembly 1 is actuated by a driving source 6. The latching ring 22*c* is arranged along the inner periphery of the transmission assembly 1 and includes a latching structure 224. A screw assembly 3 includes a nut 31*c* and a screw rod 32 threadedly engaged with each other. The interactive structure 21*b* is arranged around the outer periphery of the nut 31*c*. The rolling balls 28 are positioned between the latching structure 224 and the interactive structure 21*b*.

During the disengagement process of the clutch assembly in the third embodiment of the prior patent application, the rolling balls 28 are pushed by the elastic restoring force of the auxiliary elastic elements S to protrude from the constricted openings 2922 of the retainer 29*c*. The protruding portions of the rolling balls 28 correspond to the protruding portion 2142 of the interactive structure 21*b*. Consequently, as the rolling balls 28 attempt to return to their original positions, they experience jamming between the protruding portion 2142 and the latching structure 224 before completing reset.

Due to this jamming in the third embodiment of the prior disclosure, a noticeable jumping sensation occurs during the disengagement process. Such a tactile anomaly not only degrades user experience but may also raise concerns about mechanical malfunction, thereby diminishing perceived product quality.

Therefore, overcoming the deficiencies of the prior disclosure is a significant challenge that the inventor of the present disclosure seeks to address.

SUMMARY OF THE DISCLOSURE

The objective of the present disclosure is to provide an automatic door opening mechanism that utilizes inclined planes on engaging members to lift rolling balls which may otherwise fall into recessed portions and become jammed during the transition of the clutch assembly from an engaged state to a disengaged state.

To achieve the above objective, the present disclosure provides an automatic door opening mechanism configured to drive an open-close member. The mechanism includes: a driving source; a transmission assembly actuated by the driving source; a screw assembly including a nut and a screw rod that are threadedly engaged, the screw rod having one end configured to connect to the open-close member, and defining a longitudinal direction and a radial direction perpendicular thereto, the nut including a positioning groove; a clutch assembly disposed between the transmission assembly and the screw assembly, wherein the nut is configured to engage or disengage the transmission assembly along the radial direction via the clutch assembly, the clutch assembly including a retainer, an interactive structure arranged around the outer periphery of the nut, a latching structure arranged around the inner periphery of the transmission assembly, and a plurality of rolling balls movably accommodated in the retainer along the radial direction and positioned between the latching structure and the interactive structure; and a plurality of engaging members arranged in a ring pattern within the positioning groove and positioned in the longitudinal direction by the positioning groove, each engaging member including at least one inclined plane corresponding to a respective rolling ball; wherein, when an external force is applied to the open-close member, the open-close member causes the transmission assembly, the latching structure, and the retainer to move together along the longitudinal direction relative to the screw assembly, and the retainer drives the rolling balls, causing each rolling ball to be lifted along the radial direction by the at least one inclined plane of the corresponding engaging member.

Compared to the related art, the present disclosure offers the advantage of enabling the clutch assembly to disengage smoothly, without causing the rolling balls to generate a noticeable jumping sensation due to jamming.

BRIEF DESCRIPTION OF THE DRAWINGS

FIG. 3-1 is an enlarged view of a nut and engaging members according to a first embodiment illustrated in FIG. 3.

FIG. 4-1 is a partially cross-sectional view based on FIG. 4.

DETAILED DESCRIPTION

Figure 1:
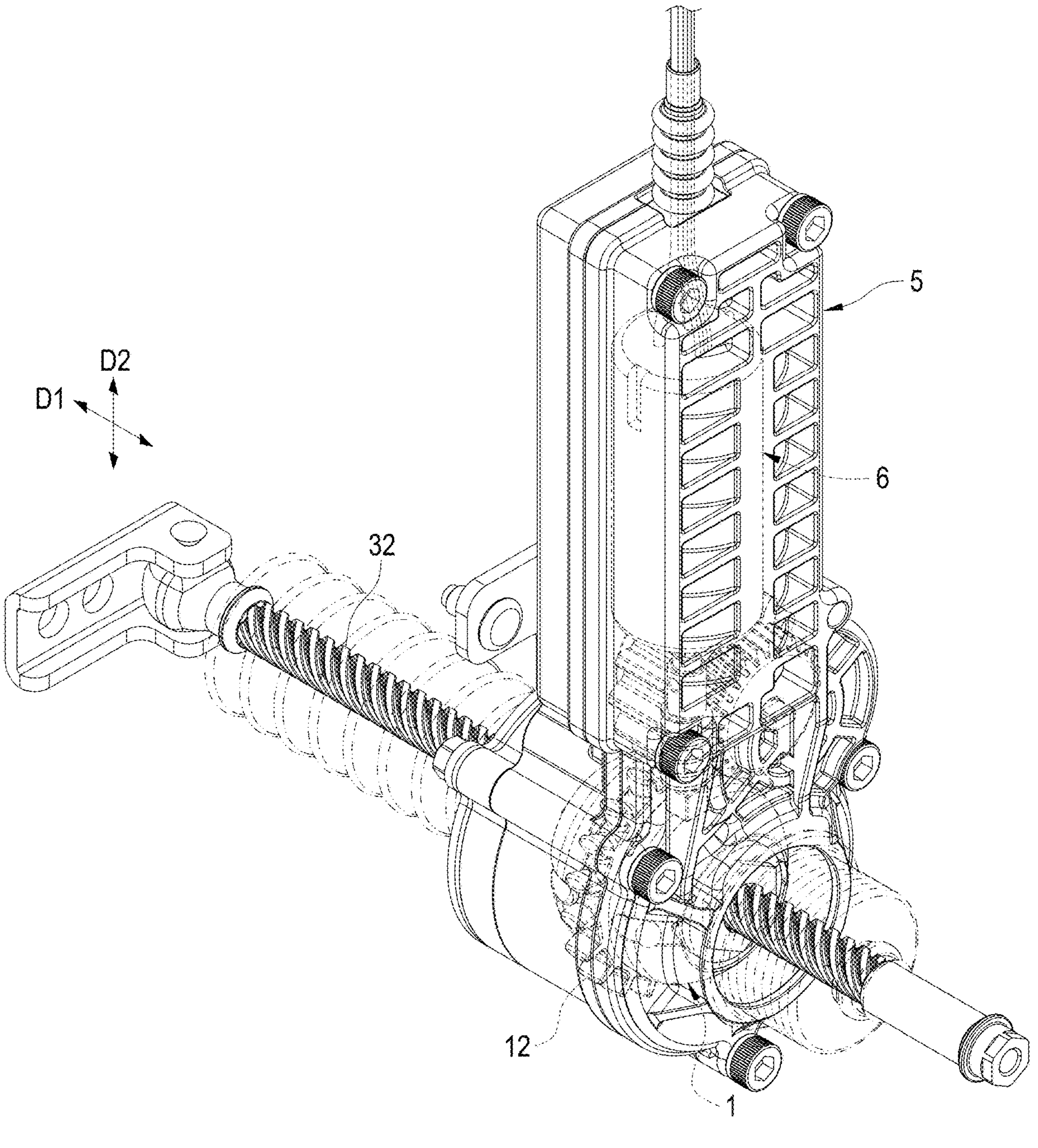
FIG. 1 is a perspective view of the present disclosure.

The following provides a detailed description of the present disclosure with reference to the accompanying drawings. These drawings are provided solely for illustrative and explanatory purposes and are not intended to limit the scope of the present disclosure.

The present disclosure provides an automatic door opening mechanism for driving an open-close member to open and close relative to a main body. The main body may be, for example, a vehicle, and the open-close member may be, for example, a door installed on the vehicle, though the present disclosure is not limited thereto.

As shown in FIGS. 1 to 9, the automatic door opening mechanism of the present disclosure includes a transmission assembly 1, a clutch assembly 2*b*, a screw assembly 3, a driving source 6, and at least one engaging member 7. Specifically, the automatic door opening mechanism further includes a housing 5, two linkage rings 8, and two first washers 9. The automatic door opening mechanism may be installed on the main body or the open-close member. In the present embodiment, the housing 5 of the automatic door opening mechanism is installed on the open-close member, and the driving source 6 is disposed in the housing 5. All components of the mechanism, except for the housing 5 itself, are arranged in the housing 5.

Figure 2:
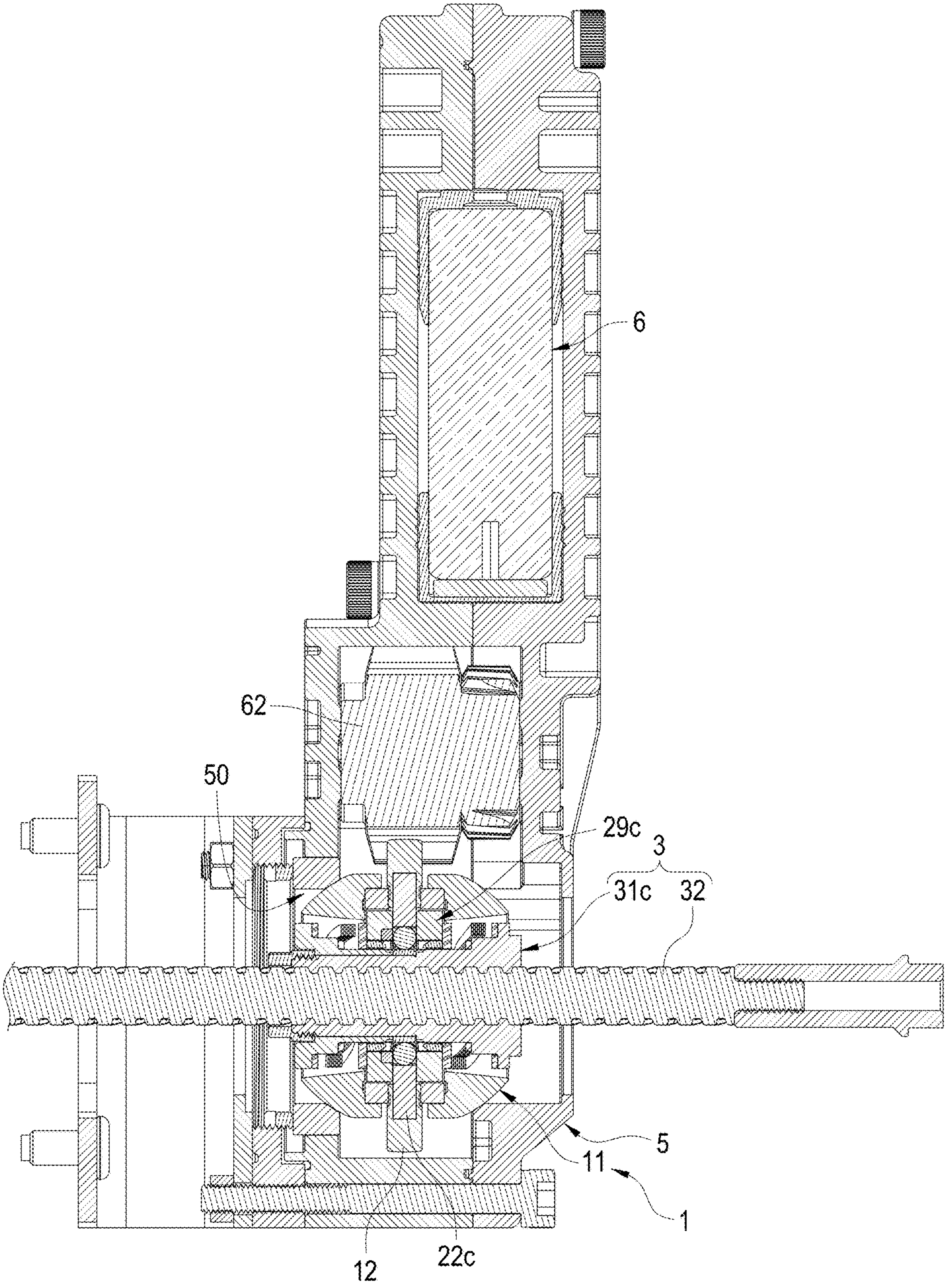
FIG. 2 is a longitudinally sectional view of the present disclosure.
Figure 8:
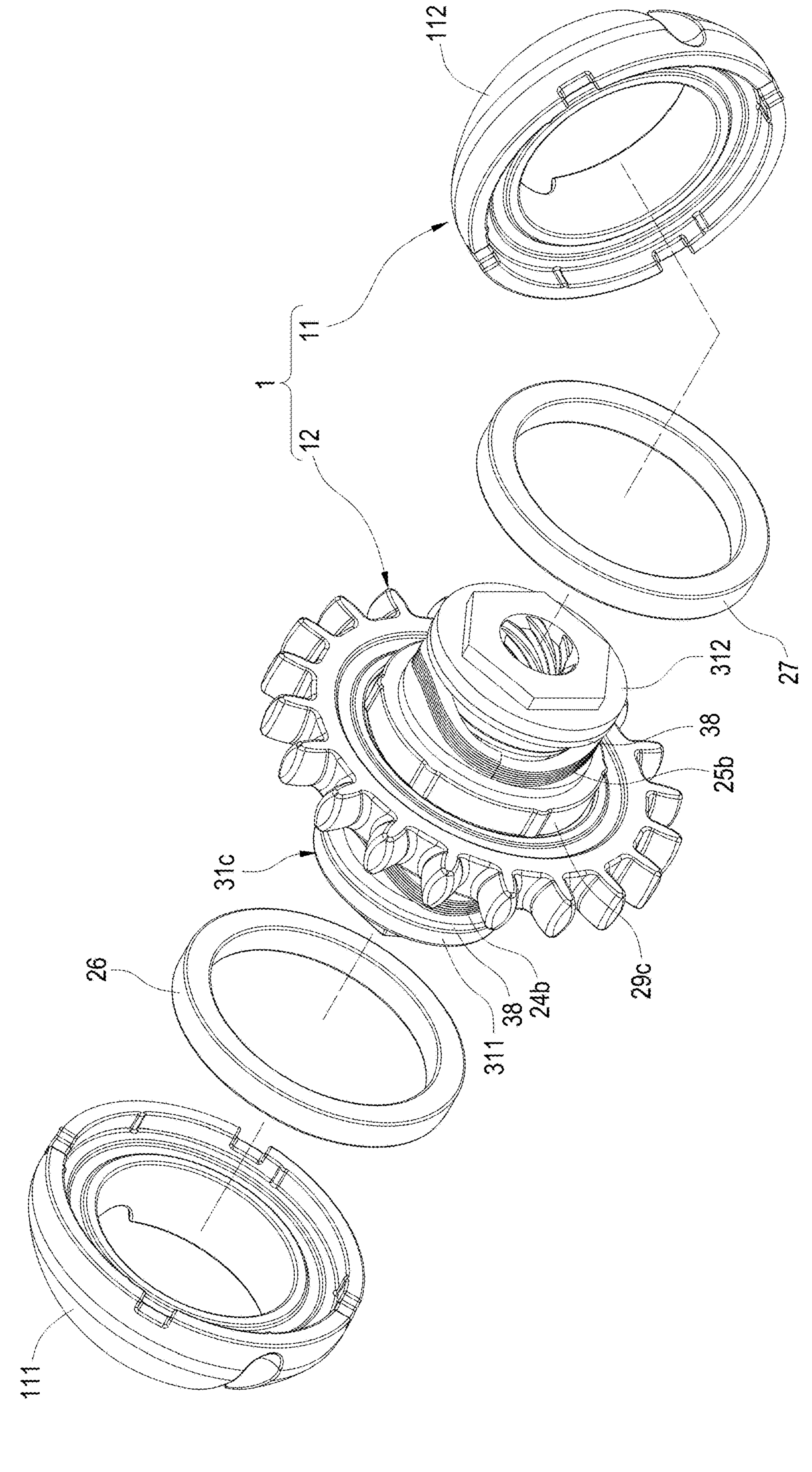
FIG. 8 is a perspective view of some components partially assembled based on FIG. 3.

The transmission assembly 1 is actuated by the driving source 6 and transfers the driving force to the screw assembly 3. The present disclosure does not limit the manner in which the transmission assembly 1 is driven or how it transmits power. The configuration may be as shown in the accompanying drawings or in other suitable forms. As illustrated in FIG. 2, the housing 5 includes a limiting portion 50, within which the transmission assembly 1 is rotatably arranged. Specifically, the transmission assembly 1 may be formed as a spherical body 11, which includes a first hemispherical structure 111 and a second hemispherical structure 112 assembled together, as shown in FIGS. 2 and 8. The transmission assembly 1 is disposed inside the limiting portion 50.

As shown in FIGS. 2 and 8, the transmission assembly 1 includes a gear ring 12 and the spherical body 11. The gear ring 12 is arranged around the outer periphery of the spherical body 11 and engaged with driving teeth 62 of the driving source 6, enabling the transmission assembly 1 to be actuated by the driving source 6. The gear ring 12 is a ring-shaped member with a plurality of driven protruding teeth (not labeled) formed on its outer periphery. These driven protruding teeth are configured to mesh with the driving teeth 62, allowing the driven teeth to engage with the driving teeth 62 and be driven when the transmission assembly 1 rotates.

The screw assembly 3 includes a nut 31*c* and a screw rod 32 threadedly engaged with each other. As shown in FIG. 1, the screw rod 32 defines a longitudinal direction D1 and a radial direction D2 perpendicular to each other in a normal state, with the longitudinal direction D1 parallel to the screw rod 32. The nut 31*c* is indirectly driven to rotate by the driving source 6, causing the screw rod 32 to extend or retract relative to the nut 31*c* along the longitudinal direction D1. One end of the screw rod 32 is connected to the main body, enabling the open-close member to be opened or closed through the extension or retraction of the screw rod 32.

Figure 3:
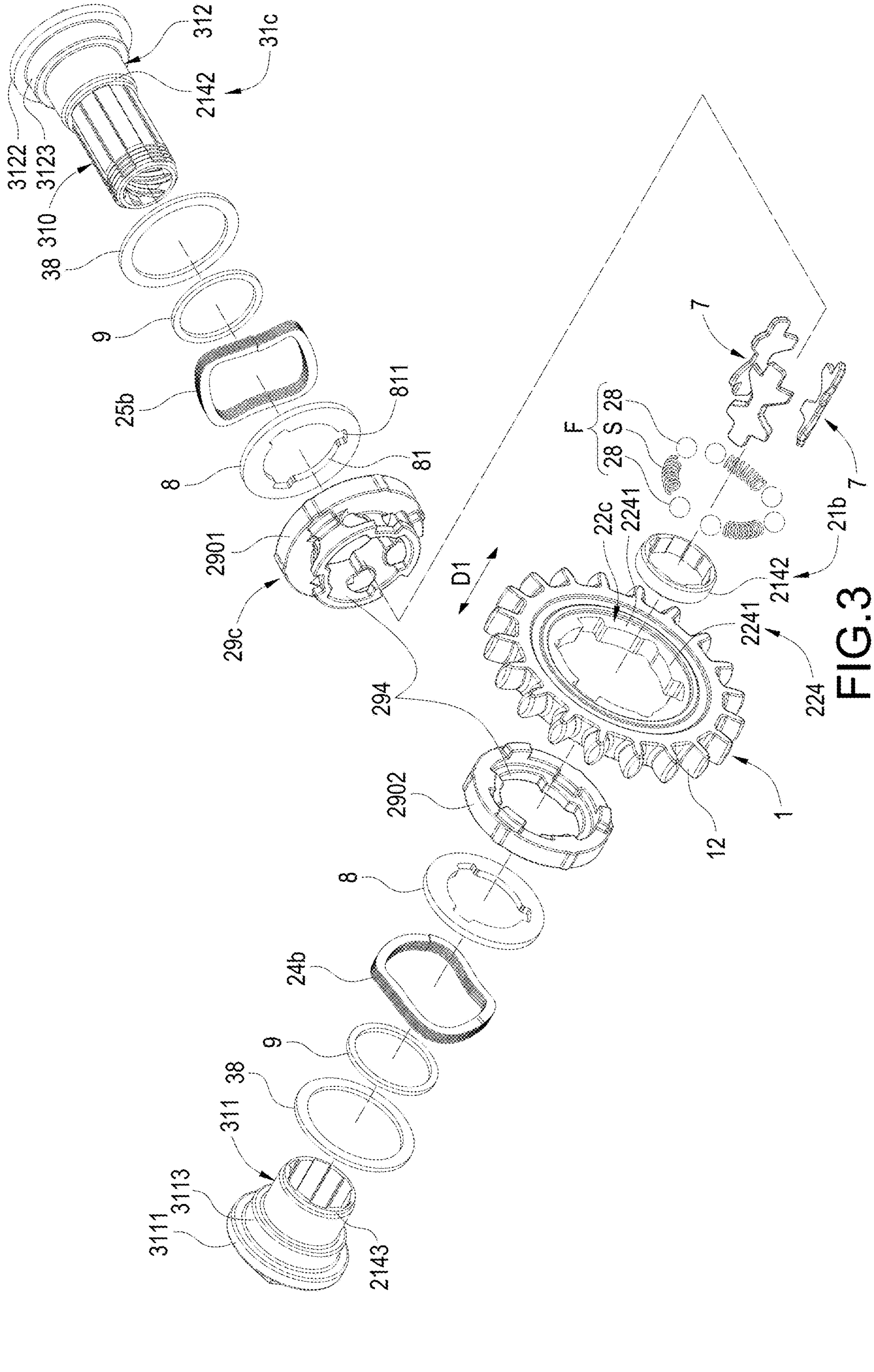
FIG. 3 is an exploded perspective view of some components of the present disclosure.
Figures 1, 3:
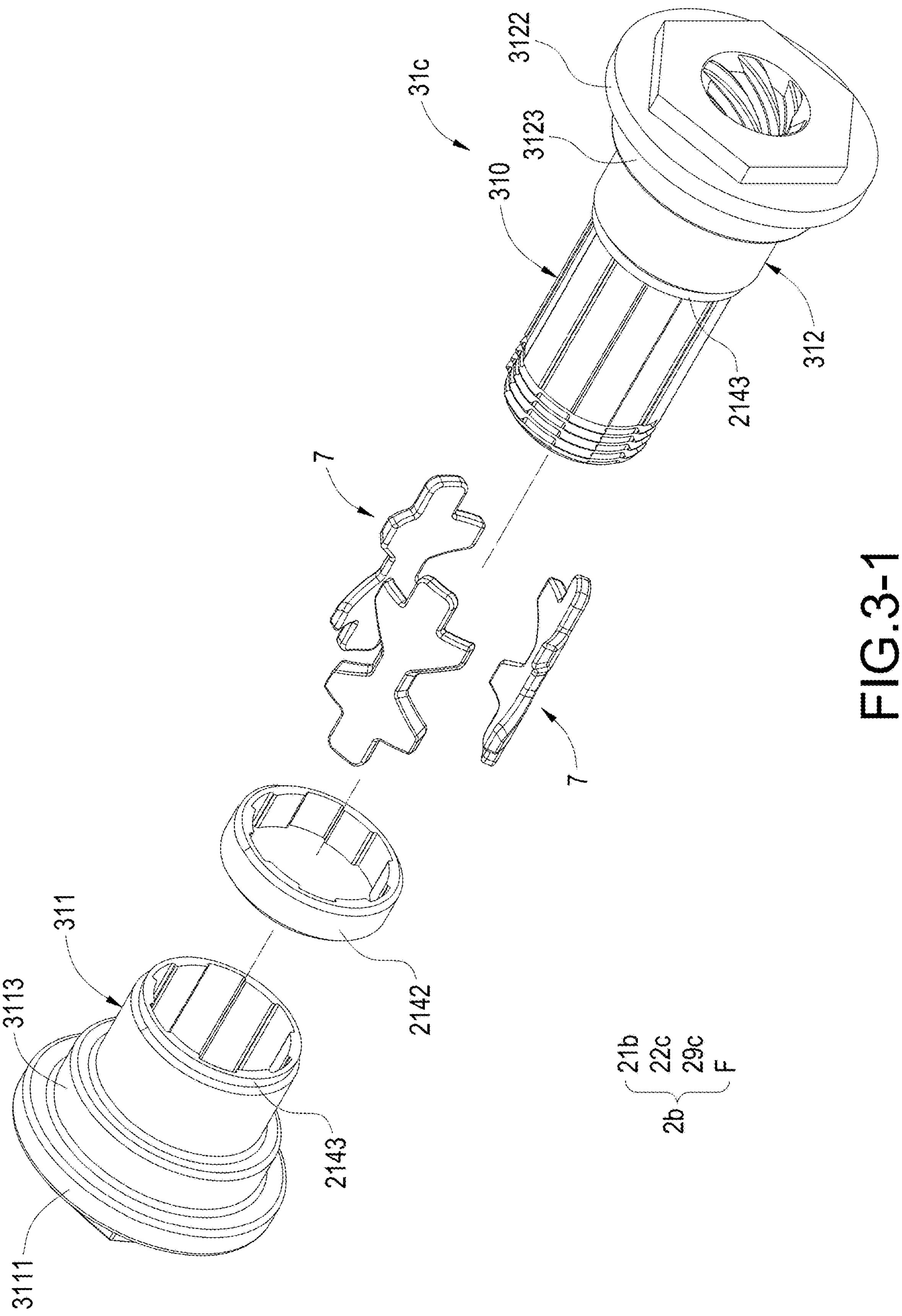
Figure 4:
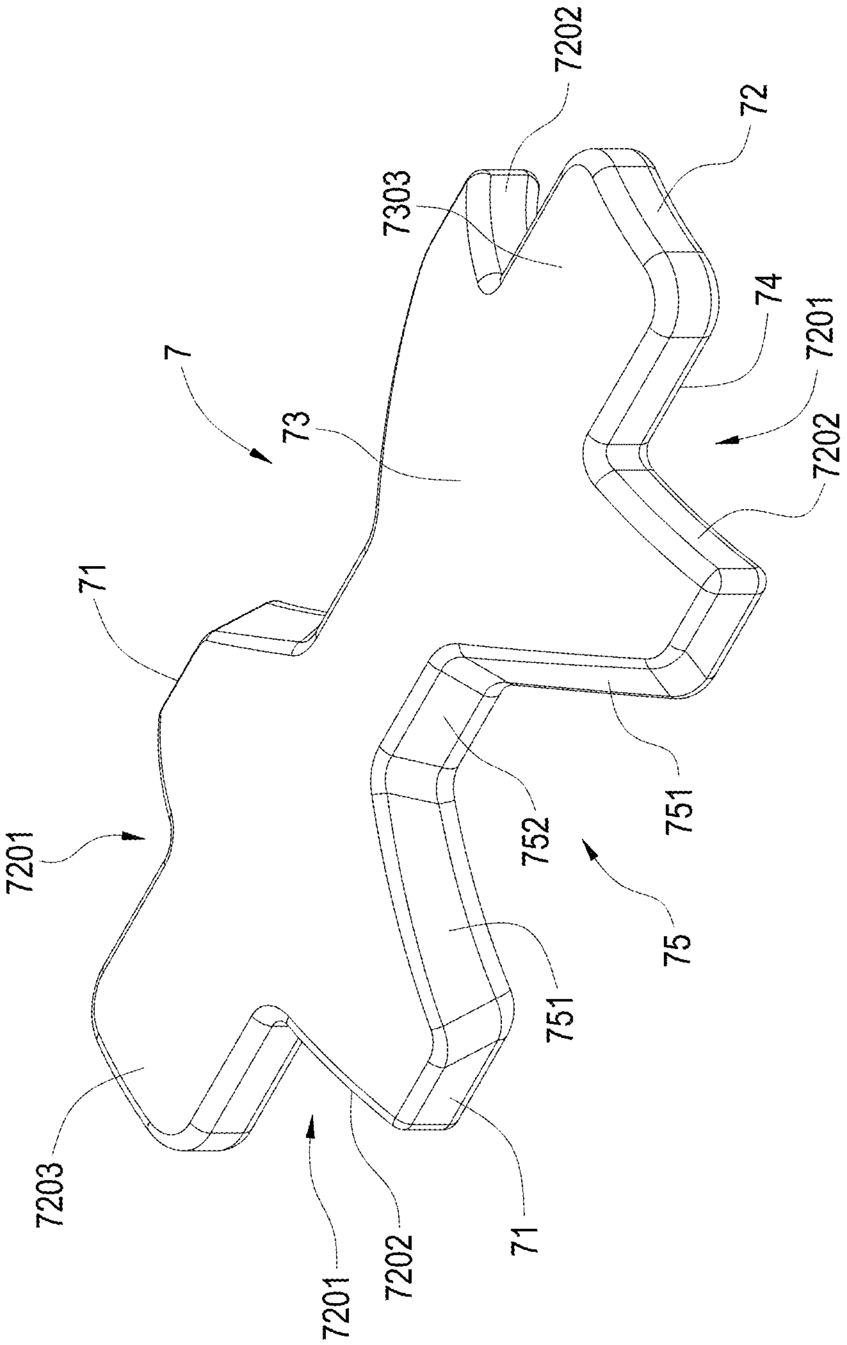
FIG. 4 is a perspective view of the engaging members according to the first embodiment of the present disclosure.
Figures 1, 4:
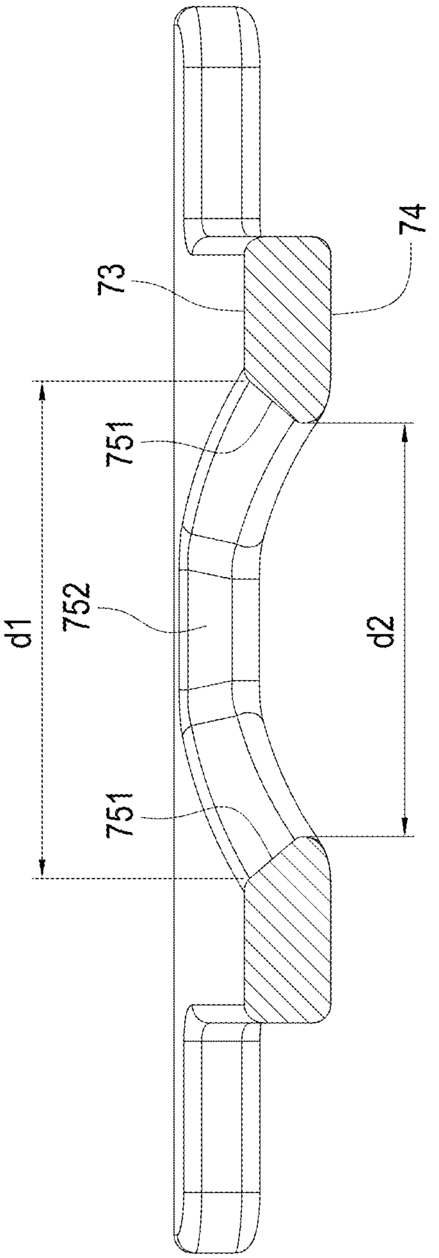
Figure 5:
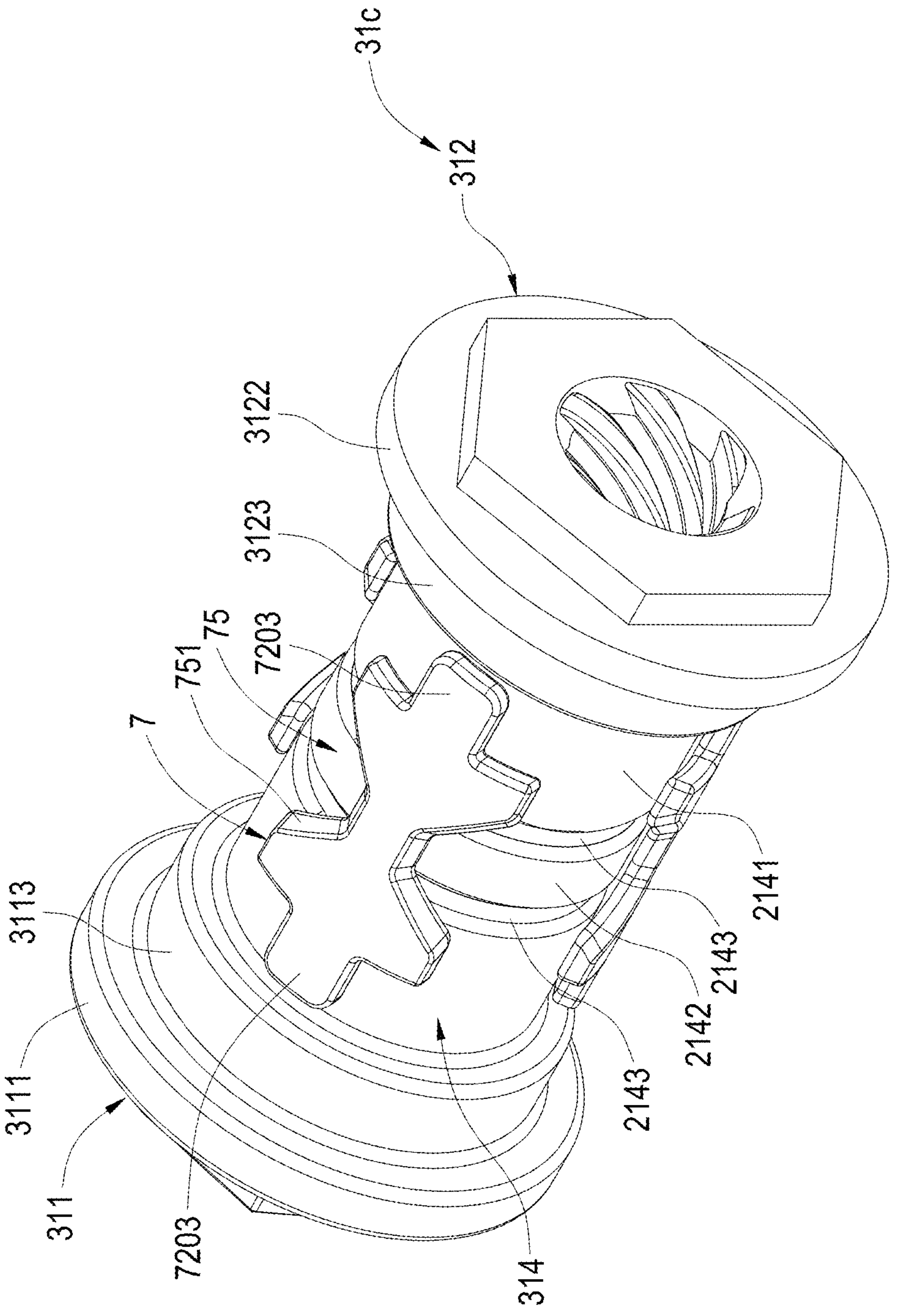
FIG. 5 is a perspective view of the engaging members according to the first embodiment when installed on the nut.

The present disclosure does not limit the configuration of the nut 31*c*, which may be a common thick ring (not shown in figures) for threading onto a screw or an elongated cylindrical shape as shown in FIGS. 3 to 5. The elongated cylindrical nut 31*c* includes a nut body 310, a first extension section 311, and a second extension section 312. The nut body 310 is configured to engage or disengage the transmission assembly 1 in the radial direction. The first extension section 311 and the second extension section 312 extend from opposite sides of the nut body 310, either integrally formed or fixedly assembled relative to each other.

Figure 9:
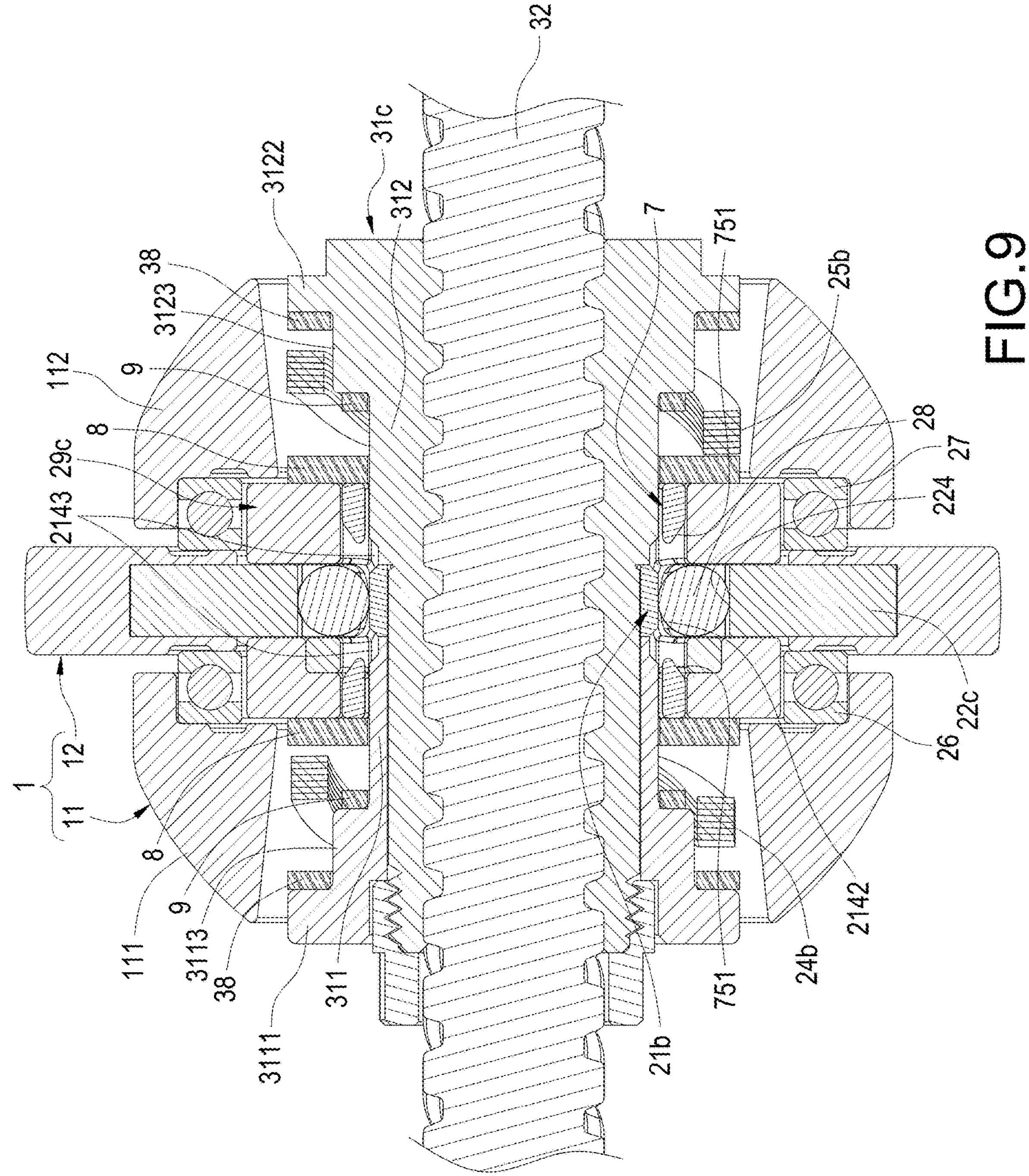
FIG. 9 is a cross-sectional view along a longitudinal direction illustrating an engaged state of the present disclosure.

The clutch assembly 2*b* has engagement and disengagement functions and is disposed between the transmission assembly 1 and the nut 31*c* of the screw assembly 3, as shown in FIGS. 2 and 9, enabling the nut 31*c* to engage or disengage the transmission assembly 1 along the radial direction D2. The clutch assembly 2*b* has an engaged state and a disengaged state. When the nut 31*c* is engaged with the transmission assembly 1, the clutch assembly 2*b* is in the engaged state, allowing the transmission assembly 1 to drive the nut 31*c*, thereby moving the screw rod 32 along the longitudinal direction D1. Conversely, when the nut 31*c* is disengaged from the transmission assembly 1, the clutch assembly 2*b* is in the disengaged state, preventing the transmission assembly 1 from driving the nut 31*c*.

Figure 16:
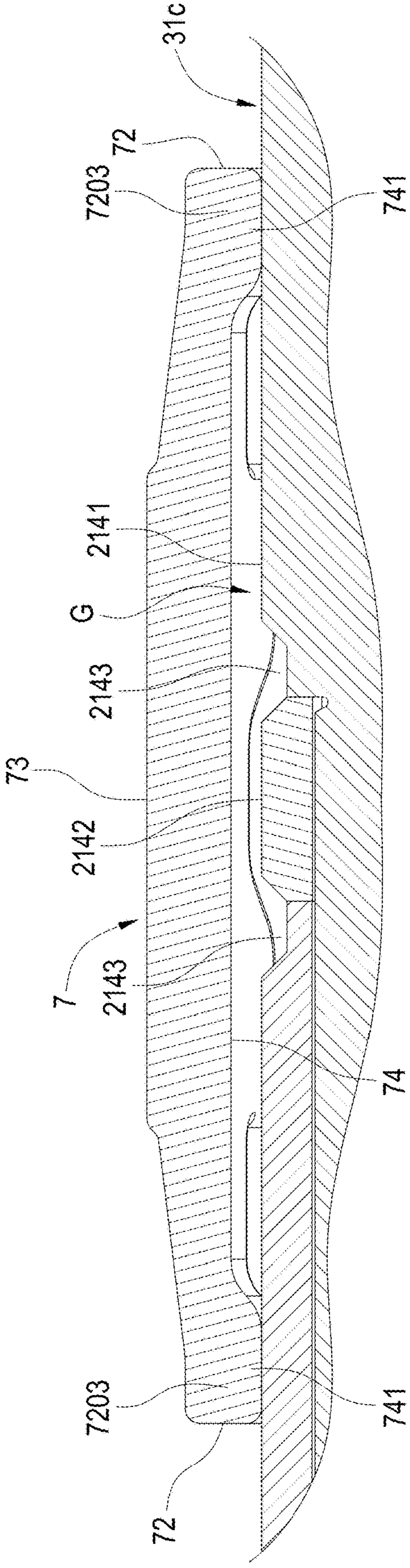
FIG. 16 is a partial cross-sectional view of the engaging member according to the second embodiment when installed on the nut.

As shown in FIGS. 3, 3-1, and 5, the clutch assembly 2*b* includes an interactive structure 21*b*, a latching structure 224, a plurality of rolling balls 28, and a plurality of auxiliary elastic elements S. Specifically, the clutch assembly 2*b* further includes a latching ring 22*c* and a retainer 29*c*. The latching structure 224 is circumferentially disposed on the inner periphery of the hollow transmission assembly 1. The interactive structure 21*b* is circumferentially disposed on the outer periphery 2141 of the nut 31*c* and includes a protruding portion 2142 and two recessed portions 2143 recessed relative to the protruding portion 2142. As shown in FIG. 9, the protruding portion 2142 and the two recessed portions 2143 are arranged side-by-side along the longitudinal direction D1. The rolling balls 28 are positioned between the latching structure 224 and the interactive structure 21*b*. In this embodiment, the interactive structure 21*b* surrounds the outer periphery 2141 of the nut 31*c*. As shown in FIGS. 5, 9, and 16, the two recessed portions 2143 are spaced apart and radially recessed from the outer periphery 2141 in the radial direction D2, such that the protruding portion 2142 is formed between the two recessed portions 2143. The interactive structure 21*b* may be integrally formed with the nut body 310 (not illustrated in figures) or configured as an assembled structure combined with the nut body 310, as shown in FIGS. 3, 3-1, and 5.

Figure 7:
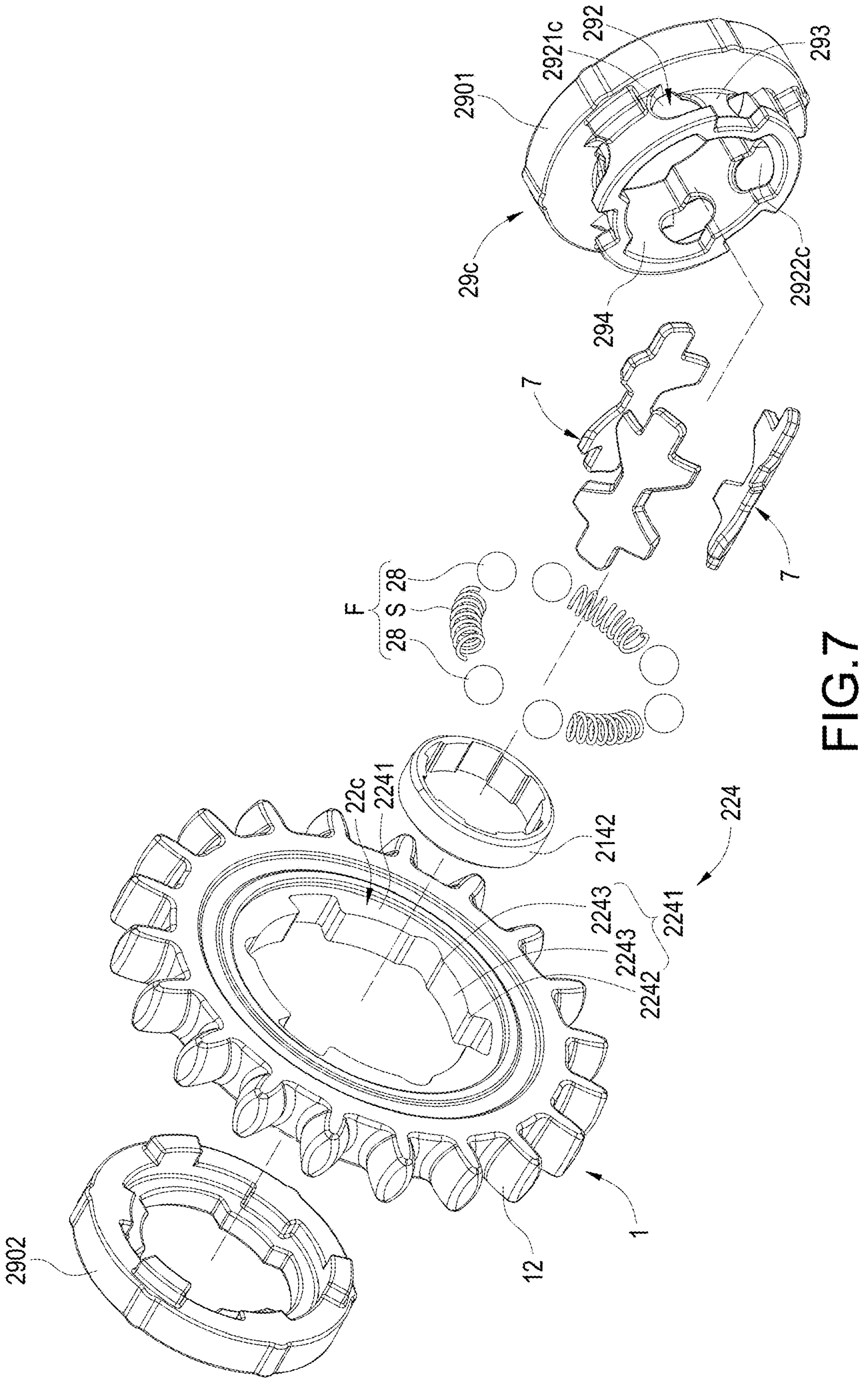
FIG. 7 is an enlarged view of some components illustrated in FIG. 3.

The retainer 29*c* may be a single-piece structure (not shown in figures) or a composite structure, as shown in FIGS. 3 and 7, including a first retaining portion 2901 and a second retaining portion 2902 that may be assembled together. As shown in FIGS. 3, 7, and 9, the retainer 29*c* has a plurality of receiving holes 292 and a plurality of channels 293. Each receiving hole 292 is opened along the radial direction D2, and each rolling ball 28 is movably accommodated in a respective receiving hole 292. Each channel 293 is connected two adjacent receiving holes 292. Each auxiliary elastic element S is positioned in the corresponding channel 293 and elastically supports two adjacent rolling balls 28, wherein the auxiliary elastic element S and the two rolling balls 28 together form an action assembly F. Specifically, as illustrated, three action assemblies F are provided in this embodiment.

Figure 10:
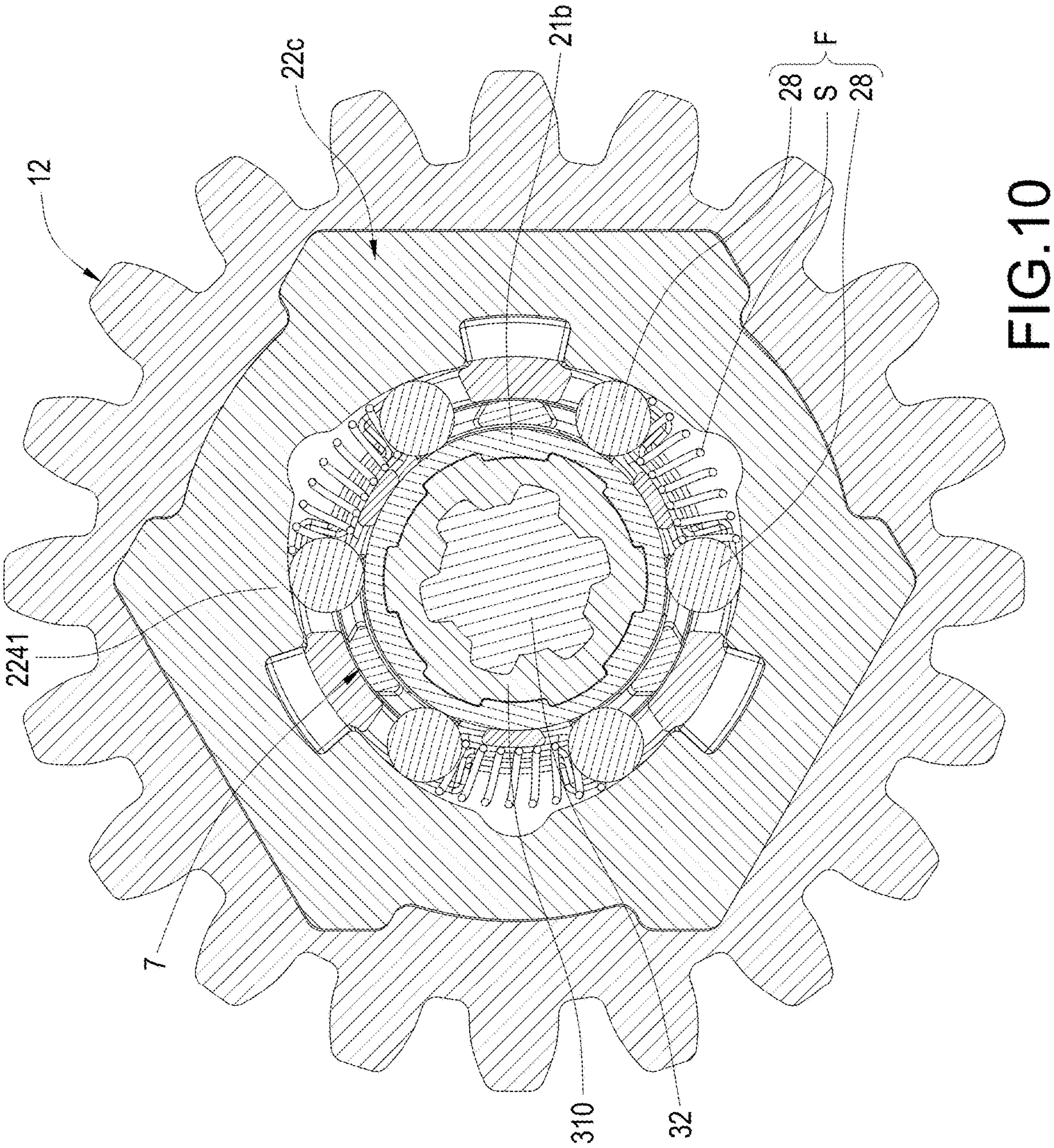
FIG. 10 is a cross-sectional view along a radial direction illustrating the engaged state of the present disclosure.

As shown in FIGS. 7 and 10, the latching ring 22*c* is disposed on the spherical body 11 and includes the latching structure 224. The retainer 29*c* is positioned between the transmission assembly 1 and the nut 31*c*, with the latching structure 224 facing the first breaches 2921*c* of the receiving holes 292 described below. The present disclosure does not limit the specific configuration of the latching structure 224, provided it enables a latching function. The latching structure 224 is designed such that the rolling balls 28 are latchable between the latching structure 224 and the interactive structure 21*b*. The manner in which the latching ring 22*c* is fixed to the transmission assembly 1 is not limited by the present disclosure. Specifically, each receiving hole 292 includes a first breach 2921*c* and a second breach 2922*c*, both extending along the radial direction D2. Each latching block 2241 of the latching structure 224 extends through a corresponding first breach 2921*c* into the retainer 29*c*. A portion of each rolling ball 28 contacts the latching structure 224 via the corresponding first breach 2921*c*, while another portion is exposed toward the interactive structure 21*b* through the corresponding second breach 2922*c*. This configuration allows each rolling ball 28 to act simultaneously upon both the latching structure 224 and the interactive structure 21*b*. Since the rolling balls 28 move back and forth within the receiving holes 292 along the radial direction D2, the clutch assembly 2*b* enables the nut 31*c* to radially engage with or disengage from the transmission assembly 1. The latching structure 224 includes a plurality of latching blocks 2241 circumferentially arranged along the inner periphery of the transmission assembly 1. Each latching block 2241 includes two latching protrusions 2242 and a release recess 2243 recessed between the two latching protrusions 2242. In the engaged state, each rolling ball 28 is latched between the protruding portion 2142 and one of the latching protrusions 2242 of the corresponding latching block 2241, as shown in FIG. 9.

Figure 12:
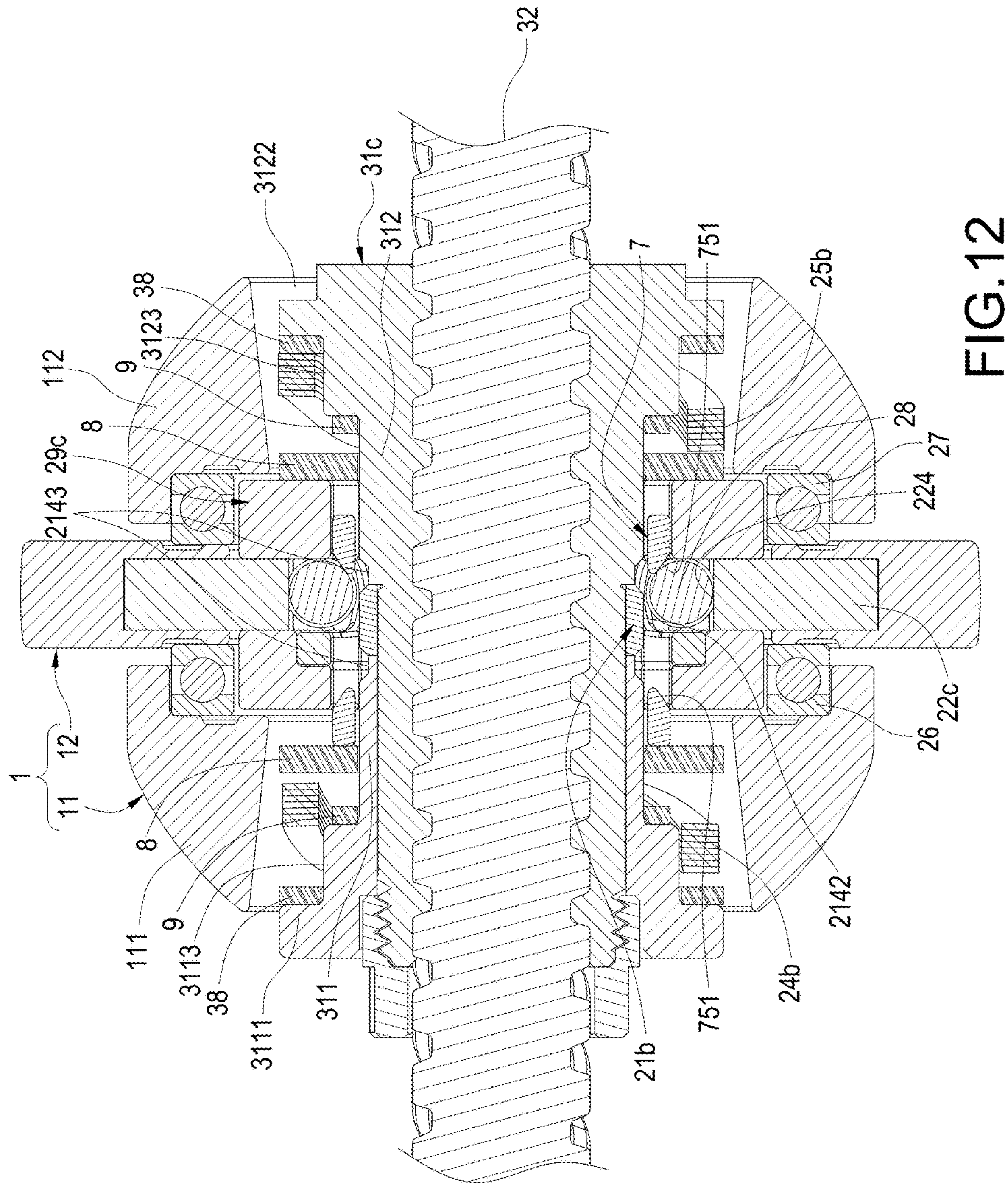
FIG. 12 is a cross-sectional view along the longitudinal direction illustrating a disengaged state of the present disclosure.

As shown in FIGS. 2 and 8, the retainer 29*c* is disposed within the spherical body 11 of the transmission assembly 1, with the latching structure 224 surrounding the rolling balls 28 along the radial direction D2. When an external force (other than from the driving source 6) is applied to the open-close member, the open-close member, via the housing 5, causes the transmission assembly 1, together with the latching structure 224 and the retainer 29*c*, to move along the longitudinal direction D1 relative to the screw assembly 3. Since the latching structure 224 and the retainer 29*c* follow the movement of the transmission assembly 1, the latching structure 224 and the action assemblies F are shifted along the longitudinal direction D1 relative to the interactive structure 21*b*, as shown in FIG. 12, thereby disengaging the transmission assembly 1 from the nut 31*c*.

As shown in FIGS. 3, 3-1, 5, and 9, the first extension section 311 and the second extension section 312 of the nut 31*c* include a first stop portion 3111 and a second stop portion 3122, respectively. A first elastic element 24*b* and a second elastic element 25*b* sheathe the first extension section 311 and the second extension section 312, respectively, and are elastically supported between opposite side surfaces of the retainer 29*c* and the corresponding first and second stop portions 3111 and 3122. Additionally, the first extension section 311 and the second extension section 312 may respectively include a first positioning portion 3113 and a second positioning portion 3123, both located between the first and second stop portions 3111 and 3122 of the nut 31*c*. The interactive structure 21*b* is positioned between the first and second positioning portions 3113 and 3123. The positioning portions 3113 and 3123 protrude circumferentially along the radial direction D2 from the outer periphery 2141 of the nut 31*c*, such that a ring-shaped positioning groove 314 is defined between the outer periphery 2141, the first positioning portion 3113, and the second positioning portion 3123.

The number of engaging members 7 in the first embodiment is not limited by the present disclosure. As an example, the quantity is described based on the number of corresponding action assemblies F. As shown in FIG. 5, the engaging members 7 are arranged in a ring pattern within the positioning groove 314, and are positioned by the positioning groove 314, allowing the nut 31*c* to move the engaging members 7 along the longitudinal direction D1 (axially). Each action assembly F, as shown in FIG. 10, is disposed between two adjacent engaging members 7, enabling the action assemblies F to move relative to the engaging members 7 along with the retainer 29*c*.

As shown in FIG. 4, each engaging member 7 includes a plurality of outer edges, a front side 73, and a back side 74 opposite to the front side 73. The outer edges connect the periphery of the front side 73 to the periphery of the back side 74. When positioned in the positioning groove 314, the back side 74 of each engaging member 7 faces the outer periphery 2141 of the nut 31*c*. While the shape of the engaging member 7 is not limited, in this embodiment it is described as a rectangular plate. The outer edges include two first outer edges 71 disposed opposite to each other and two second outer edges 72 disposed opposite to each other. Between any two adjacent engaging members 7, their respective first outer edges 71 are spaced apart.

Each first outer edge 71 of the engaging member 7 defines a notch 75, and two inclined planes 751 are formed opposite to each other within each notch 75. As shown in FIG. 4-1, the distance between the two inclined planes 751 decreases from the front side 73 toward the back side 74. Specifically, the inclined planes 751 have a first spacing d1 at the front side 73 and a second spacing d2 at the back side 74, where the spacing gradually narrows from the first spacing d1 to the second spacing d2. Each rolling ball 28 is positioned between the two inclined planes 751 of the corresponding notch 75, and the first outer edges 71 of the engaging member 7 are parallel to the longitudinal direction D1. Each auxiliary elastic element S elastically supports two rolling balls 28 between the notches 75 of two adjacent engaging members 7.

Each engaging member 7 further includes two spaced-apart nicks 7201 formed in each second outer edge 72. These nicks 7201 define a rib 7203 between them and two shoulder portions 7202 recessed relative to the second outer edge 72. In other words, the portion of the second outer edge 72 not cut out forms the rib 7203, while the shoulder portions 7202 are located on either side of each rib 7203. As shown in FIG. 5, each engaging member 7 is positioned in the longitudinal direction D1 by the positioning groove 314 via the free ends of the ribs 7203 (i.e., the remaining portions of the second outer edges 72).

Specifically, each notch 75 extends from one first outer edge 71 toward the other first outer edge 71. An inner edge 752 is defined at the terminal end of each notch 75. The notch 75 may have a flared or horn-like shape, with its width gradually narrowing from the first outer edge 71 toward the inner edge 752. The flared shape of each notch 75 is defined by the two inclined planes 751 and the inner edge 752.

As shown in FIGS. 8 and 9, the clutch assembly 2*b* further includes a first bearing 26 and a second bearing 27. The first bearing 26 is disposed between the first hemispherical structure 111 of the spherical body 11 and the first retaining portion 2901. The second bearing 27 is disposed between the second hemispherical structure 112 and the second retaining portion 2902.

As illustrated in FIGS. 2 and 9 to 11, when the driving source 6 actuates the transmission assembly 1 to rotate, the latching ring 22*c* and the retainer 29*c* rotate together with the transmission assembly 1. During this rotation, interference or alignment in the radial direction D2 occurs among the rolling balls 28, the latching structure 224, and the interactive structure 21*b*. As a result, a portion of each rolling ball 28 in the retainer 29*c* is pushed and pressed by the latching structure 224, causing the rolling balls 28 to latch between the latching structure 224 and the protruding portion 2142. This latching action causes the nut 31*c* to engage with the transmission assembly 1. Consequently, as the transmission assembly 1, driven by the driving source 6, rotates, the transmission assembly 1 drives the nut 31*c* to rotate, moving the screw rod 32 along the longitudinal direction D1, thereby opening or closing the open-close member.

Figure 13:
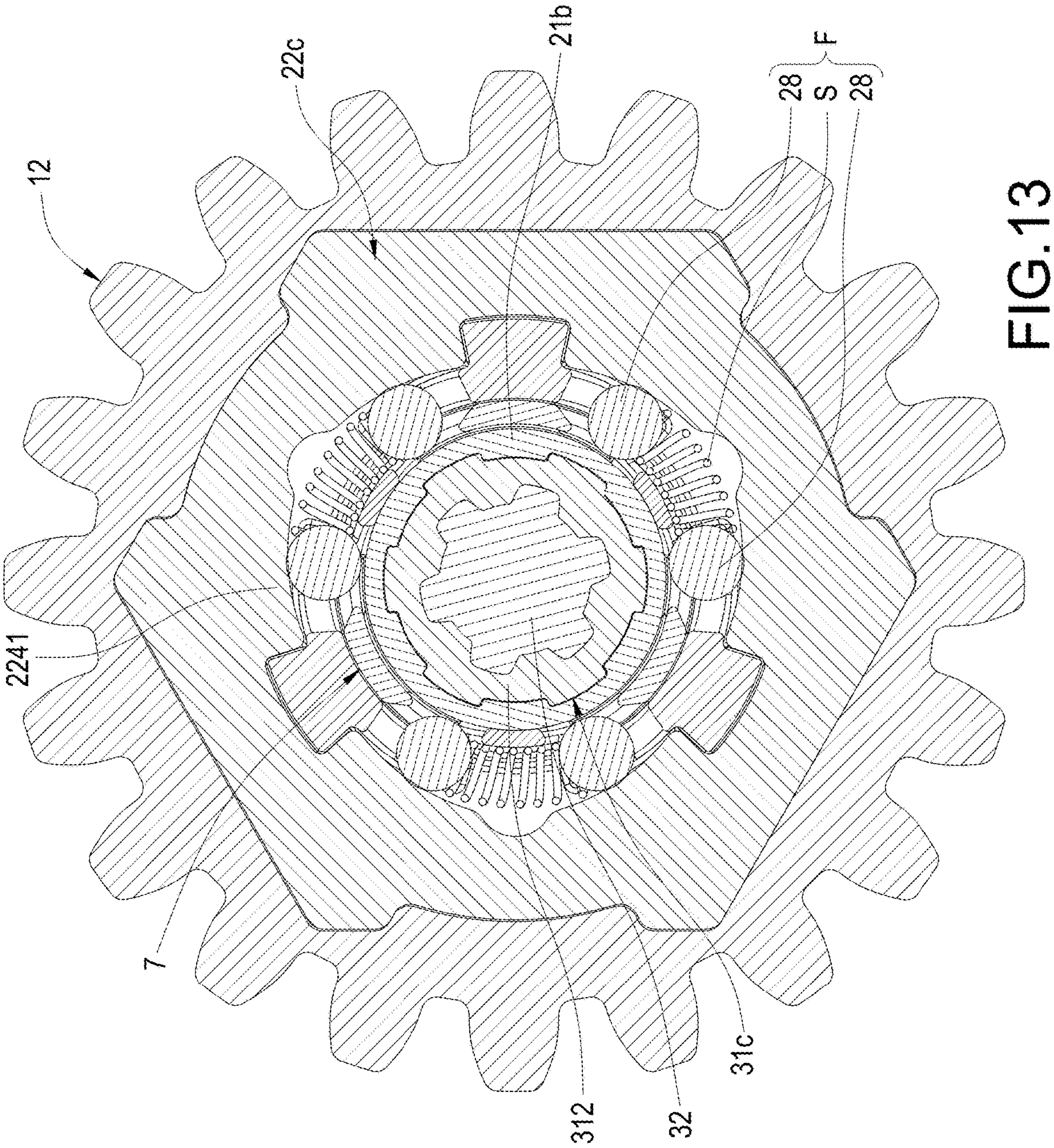
FIG. 13 is a cross-sectional view along the radial direction illustrating the disengaged state of the present disclosure.
Figure 14:
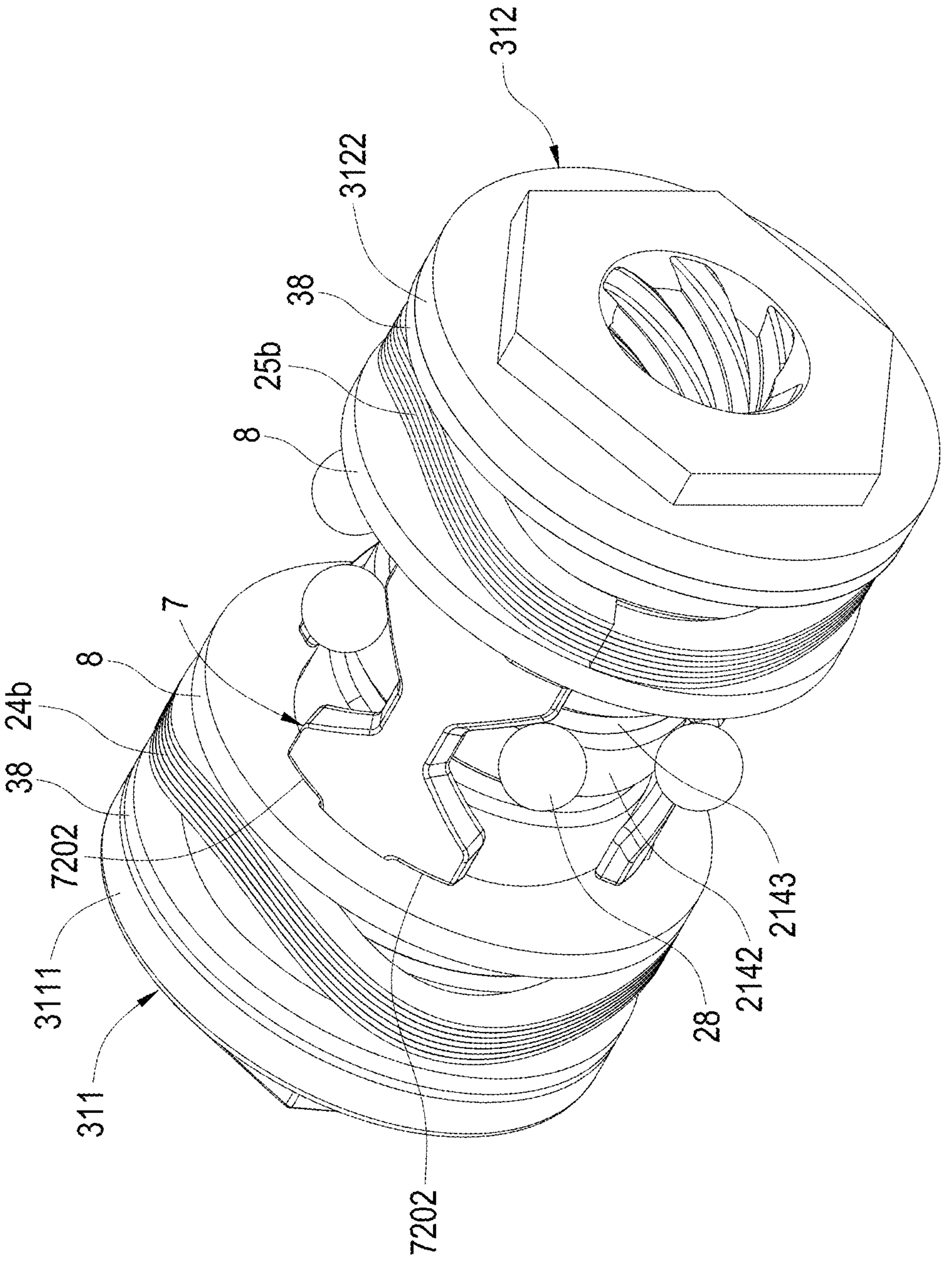
FIG. 14 is a perspective view of the nut, rolling balls, and engaging members in the disengaged state of the present disclosure.

Conversely, as shown in FIGS. 12 to 14, when an external force is applied to the open-close member, causing the transmission assembly 1, the retainer 29*c*, and the latching ring 22*c* to move together along the longitudinal direction D1. The rolling balls 28 move with the retainer 29*c* along the longitudinal direction D1. As the other portion of each rolling ball 28 moves from the protruding portion 2142 toward the recessed portion 2143, each rolling ball 28 passes across the inclined planes 751 of the engaging members 7 before reaching the recessed portion 2143. The inclined planes 751 lift the rolling balls 28 upward along the radial direction D2, preventing them from dropping into the recessed portions 2143. This ensures that the rolling balls 28 do not jam in the recessed portions 2143 when returning to their original positions, thereby avoiding any noticeable jumping sensation. At this point, the rolling balls 28 are no longer latched by the latching structure 224, causing the transmission assembly 1 to disengage from the nut 31*c*. Even if the screw rod 32 is actively being driven, the instantaneous disengagement prevents the transmission assembly 1 from rotating the nut 31*c*. As a result, the open-close member moves according to the externally applied force. Notably, in this state, the nut 31*c* rotates relative to the screw rod 32 due to the external force.

In this embodiment, during the disengagement process described above, the two rolling balls 28 in each action assembly F are subject to the elastic restoring force of the auxiliary elastic element S. This force would ordinarily push the rolling balls 28 into the recessed portion 2143. However, because the inclined planes 751 of the engaging members 7 lift the rolling balls 28 during their movement, the balls are prevented from falling into the recessed portion 2143.

As illustrated in FIGS. 4, 4-1, and 9 to 12, the two inclined planes 751 in each notch 75 are inclined toward each other along the longitudinal direction D1. The width of the flared opening defined by these inclined planes decreases along the circumferential path followed by the action assemblies F, tapering from the first outer edge 71 toward the inner edge 752. This narrowing width serves to compress the auxiliary elastic element S located between the two rolling balls 28 in each action assembly F as the rolling balls 28 move along the longitudinal direction D1. Accordingly, by configuring the inclined planes 751 to incline oppositely along D1 and by defining the notch 75 with a flared opening that narrows from the first outer edge 71 to the inner edge 752, the rolling balls 28 may be effectively disengaged from the latched state.

When the open-close member causes the nut 31*c* to move relative to the screw rod 32, the nut 31*c* rotates relative to the screw rod 32. If the engaging members 7 are made of metal and the nut 31*c* is made of plastic, significant friction may occur between the metallic ribs 7203 of the engaging members 7 and the plastic material of the nut 31*c*. This may cause the engaging members 7 to shift due to friction or may result in wear or damage to the plastic nut 31*c*.

To prevent such issues, as shown in FIGS. 3, 3-1, 5, and 9, the screw assembly 3 may include two first washers 9 made of metal. One washer 9 is clamped between the first positioning portion 3113 and one of the ribs 7203 of each engaging member 7, while the other washer 9 is clamped between the second positioning portion 3123 and the other rib 7203 of each engaging member 7. This results in metal-to-metal friction between the ribs 7203 and the first washers 9, preventing the engaging members 7 from shifting and avoiding wear on the nut 31*c*.

The screw assembly 3 may further include two second washers 38 made of metal. These second washers 38 are elastically urged by the first and second elastic elements 24*b* and 25*b* to abut against the first and second stop portions 3111 and 3122, respectively. This allows the first elastic element 24*b* and the second elastic element 25*b* to frictionally engage the second washers 38, providing a wear-resistant effect as the first washers 9.

Due to unavoidable manufacturing tolerances, the first elastic element 24*b* and the second elastic element 25*b* may have different elastic forces, with one being stronger than the other. When they provide elastic support, this imbalance may cause the latching structure 224 to become radially misaligned with the interactive structure 21*b* along the radial direction D2. As a result, even when the clutch assembly 2*b* is intended to be in the engaged state, engagement may fail due to misalignment caused by the difference in spring forces.

To address this issue, and as shown in FIGS. 3, 4 to 6, and 9, the automatic door opening mechanism further includes two linkage rings 8 sleeved on the first and second extension sections 311, 312 of the nut 31*c*. For example, one linkage ring 8 abuts against both one side surface of the retainer 29*c* and the Shoulder portions 7202 of one end of each engaging member 7, with its other side elastically urged by one of the first or second elastic elements 24*b*, 25*b*. Taking one linkage ring 8 as an example, one face of the linkage ring 8 abuts against both one side surface of the retainer 29*c* and the shoulder portions 7202 of one end of each engaging member 7, while its opposite face is elastically urged by either the first elastic element 24*b* or the second elastic element 25*b*. The other linkage ring 8 is symmetrically configured, abutting against the other side surface of the retainer 29*c* and the shoulder portions 7202 of the other end of each engaging member 7, with its other side elastically urged by the other elastic element.

As a result, one end of the first elastic element 24*b* pushes one side of the retainer 29*c* and to the two shoulder portions 7202 of one end of each engaging member 7 via one linkage ring 8, while one end of the second elastic element 25*b* does the same on the opposite side of the retainer 29*c* and the shoulder portions 7202 of the other end of each engaging member 7 via the other linkage ring 8. This configuration ensures that, regardless of any manufacturing tolerance between the first and second elastic elements 24*b*, 25*b*, the latching structure 224 remains aligned with the interactive structure 21*b* in the radial direction D2, thereby securing proper engagement of the clutch assembly 2*b*.

As illustrated in FIG. 9 and FIG. 12, when an external force is applied—e.g., a user pushes the open-close member—causing the open-close member, the housing 5, the transmission assembly 1, the retainer 29*c*, and the action assemblies F to move toward the left (and the nut 31*c* to relatively shift rightward), the left side of the retainer 29*c* pushes the left linkage ring 8, thereby compressing the left-side first elastic element 24*b*. Meanwhile, the right-side linkage ring 8 is blocked by the shoulder portions 7202 of the engaging members 7 and moves away from the retainer 29*c* along D1. Thus, only the first elastic element 24*b* on the left applies a restoring force to the retainer 29*c*, effectively avoiding simultaneous compression from both elastic elements 24*b* and 25*b*.

Figure 6:
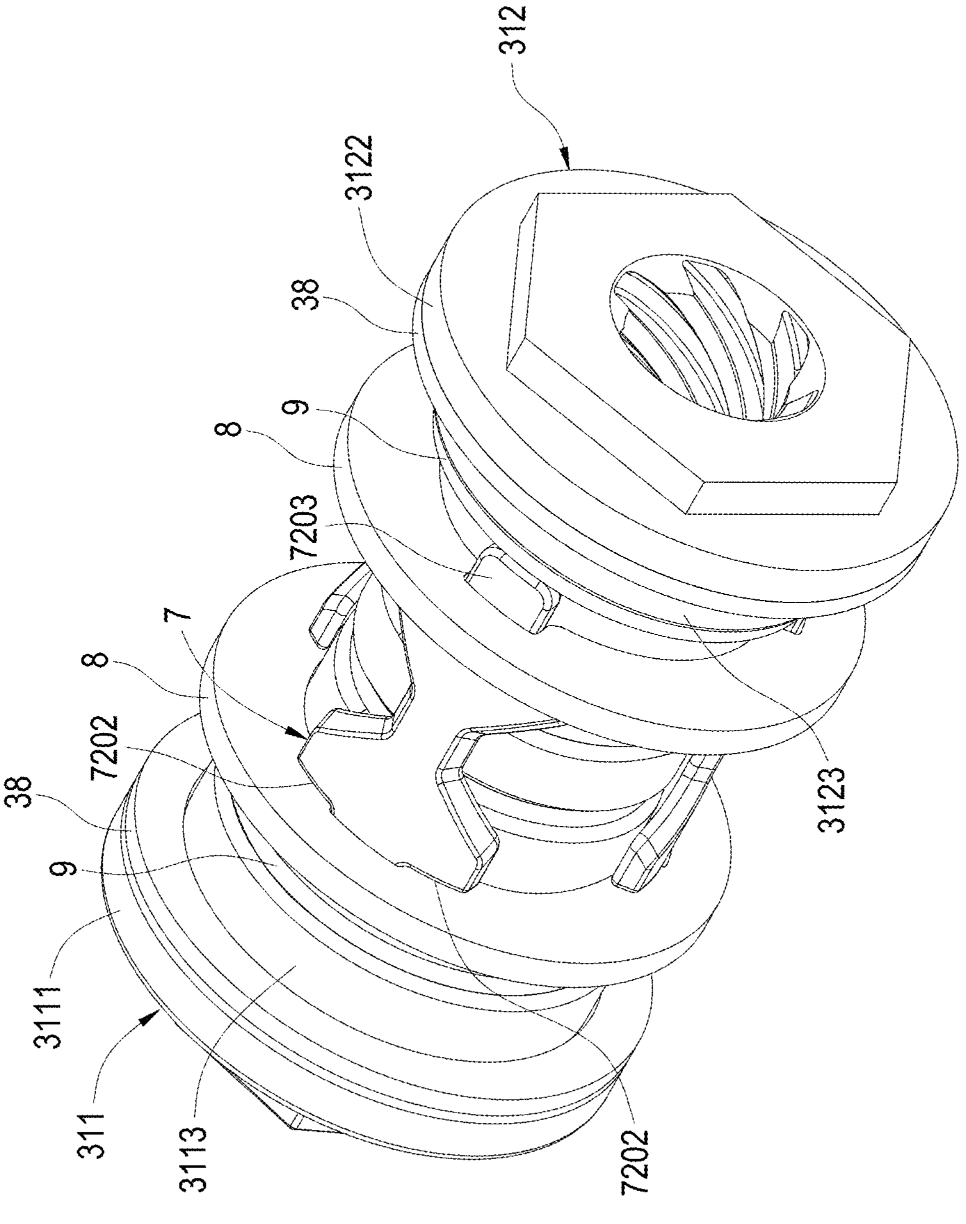
FIG. 6 is a perspective view based on FIG. 5, showing the addition of linkage rings.

It should be noted that, to ensure that the ribs 7203 of each engaging member 7 continue to abut against the first washers 9 even when the linkage rings 8 are included, as shown in FIGS. 3 and 6, each linkage ring 8 may be formed as a hollow ring with an inner peripheral edge 81. The inner edge 81 is formed with a plurality of recesses 811. These recesses allow the ribs 7203 to movably pass through the linkage rings 8 to abut against the first washers 9.

Figure 11:
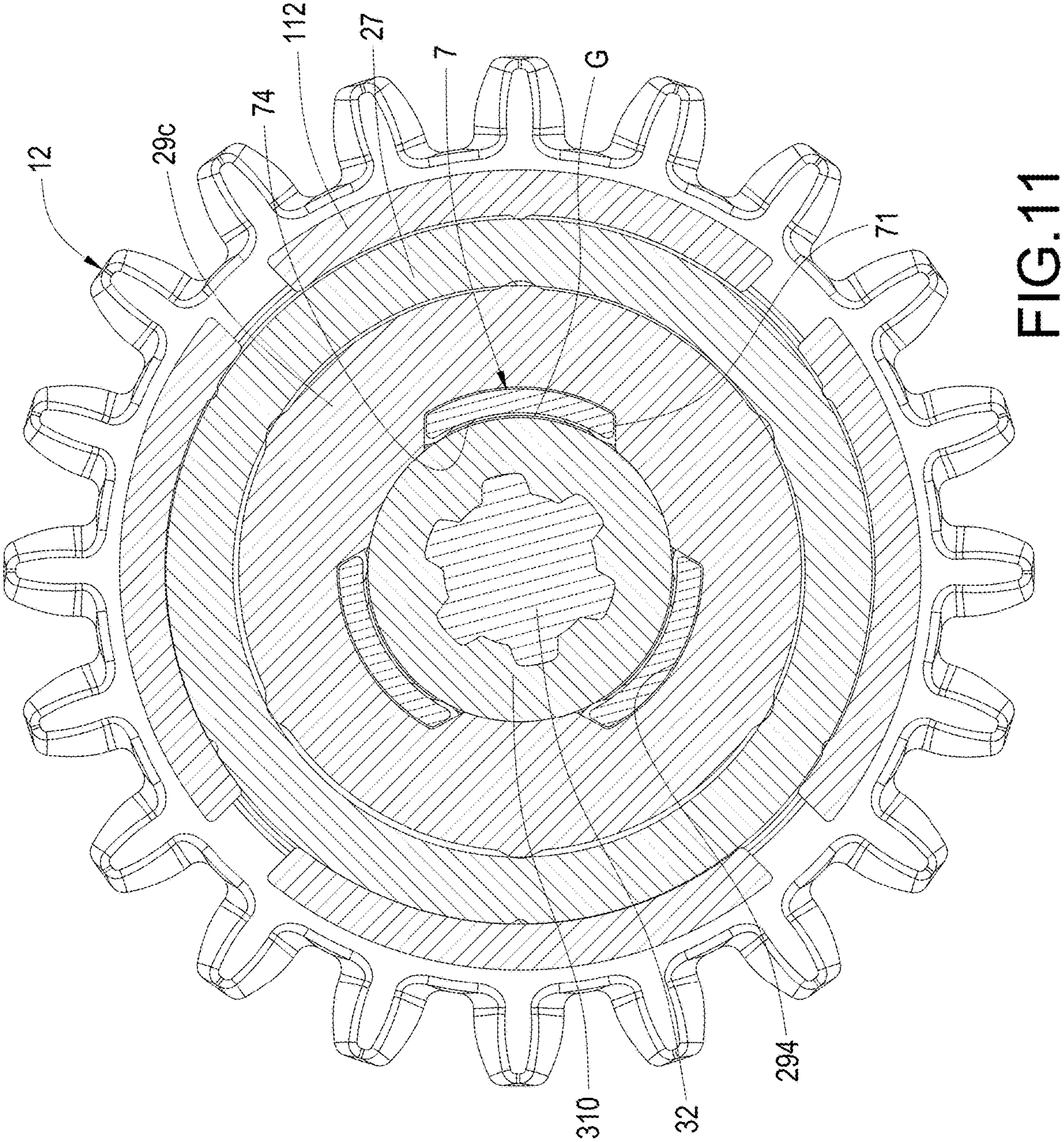
FIG. 11 is another cross-sectional view along the radial direction illustrating the engaged state of the present disclosure.

As shown in FIG. 11, to prevent the back side 74 of each engaging member 7 (metal) from scraping against the protruding portion 2142 (also metal) of the nut 31*c*—an issue that could cause a jarring tactile sensation or damage to the protruding portion—a gap G is maintained between the back side 74 and the protruding portion 2142. For example, the ribs 7203 of each engaging member 7 abut against the two first washers 9 to elevate the engaging member 7 by the required gap G. In this embodiment, the protruding height of the protruding portion 2142 is flush with the outer periphery 2141 of the first and second extension sections 311, 312.

As shown in FIGS. 3, 7, and 11, to ensure each engaging member 7 moves only along the longitudinal direction D1 relative to the retainer 29*c*, the inner peripheral wall (not labeled) of the retainer 29*c* defines a plurality of Guiding grooves 294 along the longitudinal direction D1. Each engaging member 7 is slidably received in a respective guiding groove 294, allowing movement only along the longitudinal direction D1 relative to the retainer 29*c*.

Figure 15:
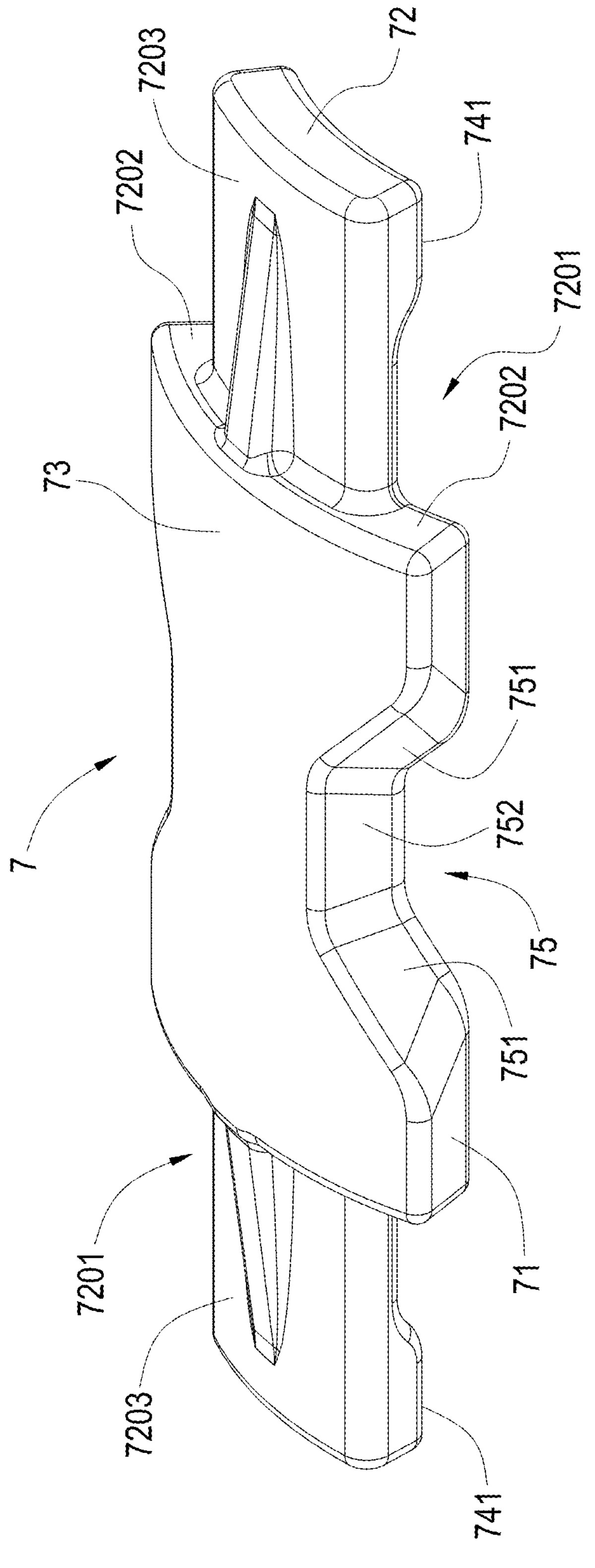
FIG. 15 is a perspective view of the engaging member according to a second embodiment of the present disclosure.

As shown in FIGS. 15 and 16, the second embodiment of the engaging member 7 is substantially similar to the first embodiment, differing in the method of creating the gap G.

As shown in FIGS. 15 and 16, the back side 74 of each engaging member 7 has two support portions 741, corresponding to the two ribs 7203. The Back side 74 is elevated by the support portions 741 on the outer periphery 2141 of the nut 31*c*, creating the required gap G between the back side 74 and the outer periphery 2141 or protruding portion 2142.

The above description covers preferred embodiments of the present disclosure and does not limit the scope of the patent. Equivalent structural changes made based on the specification and drawings are included within the scope of the present disclosure.

What is claimed is:

1. An automatic door opening mechanism, for driving an open-close member, and comprising:

a driving source;

a transmission assembly, driven by the driving source;

a screw assembly, comprising a nut and a screw rod threadedly engaged with each other, wherein one end of the screw rod is connected to the open-close member, the screw rod comprises a longitudinal direction and a radial direction perpendicular to the longitudinal direction, and the nut comprises a positioning groove;

a clutch assembly, disposed between the transmission assembly and the screw assembly, wherein the nut is engageable with or disengageable from the transmission assembly along the radial direction via the clutch assembly, the clutch assembly comprises a retainer, an interactive structure, a latching structure, and a plurality of rolling balls, each of the rolling balls is movably accommodated in the retainer along the radial direction, the latching structure is disposed encircling along an inner periphery of the transmission assembly, the interactive structure is disposed encircling along an outer periphery of the nut, and the plurality of rolling balls are positioned between the latching structure and the interactive structure; and a plurality of engaging members, arranged circularly in the positioning groove and positioned along the longitudinal direction by the positioning groove, each of the engaging members comprising at least one inclined plane corresponding to each of the rolling balls;

wherein, when an external force is applied to the open-close member, the open-close member drives the transmission assembly, the latching structure, and the retainer to move together along the longitudinal direction relative to the screw assembly, and the retainer drives the rolling balls to move to make each of the rolling balls be lifted along the radial direction by the inclined plane.

2. The automatic door opening mechanism according to claim 1, wherein each of the engaging members comprises a front side and a back side opposite to each other, the back side faces the outer periphery of the nut, two notches are defined on each of the engaging members, each of the notches comprises two inclined planes opposite to each other, each of the rolling balls is positioned between the two inclined planes of each of the notches, and a distance between the two inclined planes of each notch decreases from the front side toward the back side.

3. The automatic door opening mechanism according to claim 2, wherein each engaging member further comprises a plurality of outer edges extending between a peripheral edge of the front side and a peripheral edge of the back side, the plurality of outer edges comprise two first outer edges disposed opposite to each other and extending parallel to the longitudinal direction, and one of the notches is defined on each of the first outer edges.

4. The automatic door opening mechanism according to claim 3, wherein the clutch assembly further comprises a plurality of auxiliary elastic elements, each auxiliary elastic element elastically supports two of the rolling balls adjacent to each other, each notch extends from one of the first outer edges toward another first outer edge to define a flared opening and an inner edge is disposed in the notch, a width of the flared opening decreases from the first outer edge toward the inner edge, and each auxiliary elastic element elastically supports two of the rolling balls adjacent to each other between the notches of two of the engaging members adjacent to each other.

5. The automatic door opening mechanism according to claim 1, wherein the retainer comprises an inner peripheral wall, a plurality of guiding grooves are defined on the inner peripheral wall along the longitudinal direction, and each of the engaging members is guided by each of the guiding grooves to move solely along the longitudinal direction relative to the retainer.

6. The automatic door opening mechanism according to claim 1, wherein the nut is elongated and cylindrical shape, and comprises a first positioning portion and a second positioning portion spaced apart along the longitudinal direction and protruding circumferentially from the outer periphery, the positioning groove is defined between the first positioning portion, the second positioning portion, and the outer periphery, wherein each engaging member comprises a plurality of outer edges, the outer edges comprise two second outer edges disposed opposite to each other, the two second outer edges of each engaging member are disposed corresponding to the first positioning portion and the second positioning portion, respectively.

7. The automatic door opening mechanism according to claim 6, wherein the screw assembly further comprises two washers, one of the two washers is clamped between the first positioning portion and one of the second outer edges of each engaging member, and another one of the two washers is clamped between the second positioning portion and another second outer edge of each engaging member.

8. The automatic door opening mechanism according to claim 1, wherein the clutch assembly further includes a first elastic element and a second elastic element, the nut is elongated and cylindrical shape and sheathes the first elastic element and the second elastic element, the nut comprises a first stop portion and a second stop portion spaced apart along the longitudinal direction and protruding circumferentially from the outer periphery, and the retainer comprises two side surfaces opposite to each other, wherein the first elastic element is elastically supported between the first stop portion and one of the side surfaces, and the second elastic element is elastically supported between the second stop portion and another side surface.

9. The automatic door opening mechanism according to claim 8, further comprising two linkage rings, wherein each engaging member comprises a plurality of outer edges, the outer edges comprise two second outer edges disposed opposite to each other, two nicks are respectively defined on the two second outer edges of each engaging member to form two shoulder portions, each engaging member is positioned in the longitudinal direction by the positioning groove via remaining portions of the two second outer edges, and the two linkage rings sheathe the nut, wherein one of the linkage rings abuts against both one of the shoulder portions of each engaging member and one of the side surfaces of the retainer and is elastically supported by the first elastic element, and another one of the linkage rings abuts against both the other shoulder portion of each engaging member and another side surface of the retainer and is elastically supported by the second elastic element.

10. The automatic door opening mechanism according to claim 9, wherein each linkage ring comprises an inner peripheral edge, a plurality of recesses is defined on the inner peripheral edge, and the remaining portions of the two second outer edges of each engaging member extend through the recesses of the respective linkage rings.

11. The automatic door opening mechanism according to claim 1, wherein each engaging member comprises a back side facing the outer periphery of the nut, and a gap is defined between the back side of each engaging member and the outer periphery of the nut.

12. The automatic door opening mechanism according to claim 1, wherein each engaging member comprises a back side and at least one support portion protruding from the back side, each engaging member is supported on the outer periphery of the nut via the at least one support portion, and a gap is defined between the back side of each engaging member and the outer periphery of the nut.

13. The automatic door opening mechanism according to claim 1, wherein the interactive structure comprises a protruding portion and at least one recessed portion disposed opposite to each other, and when the plurality of rolling balls are latched between the latching structure and the protruding portion, the nut is engaged with the transmission assembly.

14. The automatic door opening mechanism according to claim 1, wherein the interactive structure comprises a protruding portion and at least one recessed portion disposed opposite to each other, and when an external force is applied to the open-close member, causing the transmission assembly, the latching structure, and the retainer to move together along the longitudinal direction, the plurality of rolling balls move with the retainer along the longitudinal direction from the protruding portion toward the at least one recessed portion and are lifted along the radial direction by the inclined planes to make the transmission assembly disengage from the nut.

15. The automatic door opening mechanism according to claim 1, further comprising a housing, the housing comprising a limiting portion, wherein the transmission assembly is rotatably disposed in the limiting portion.

* * * * *